Oct. 17, 1939.  A. H. HABERSTUMP  2,176,131
VEHICLE TOP
Filed Sept. 17, 1937   3 Sheets-Sheet 3
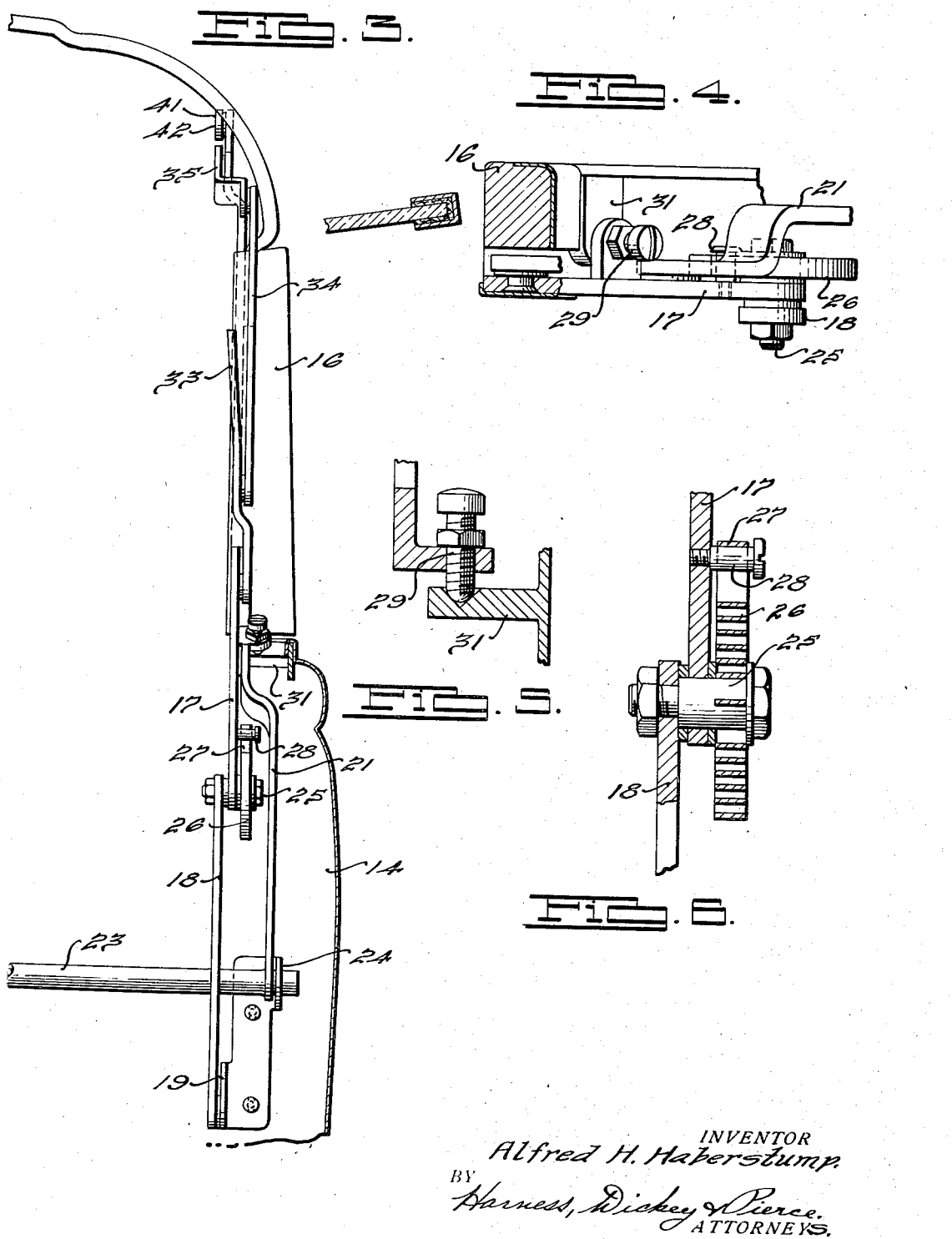
INVENTOR
Alfred H. Haberstump
BY Harness, Dickey & Pierce.
ATTORNEYS.

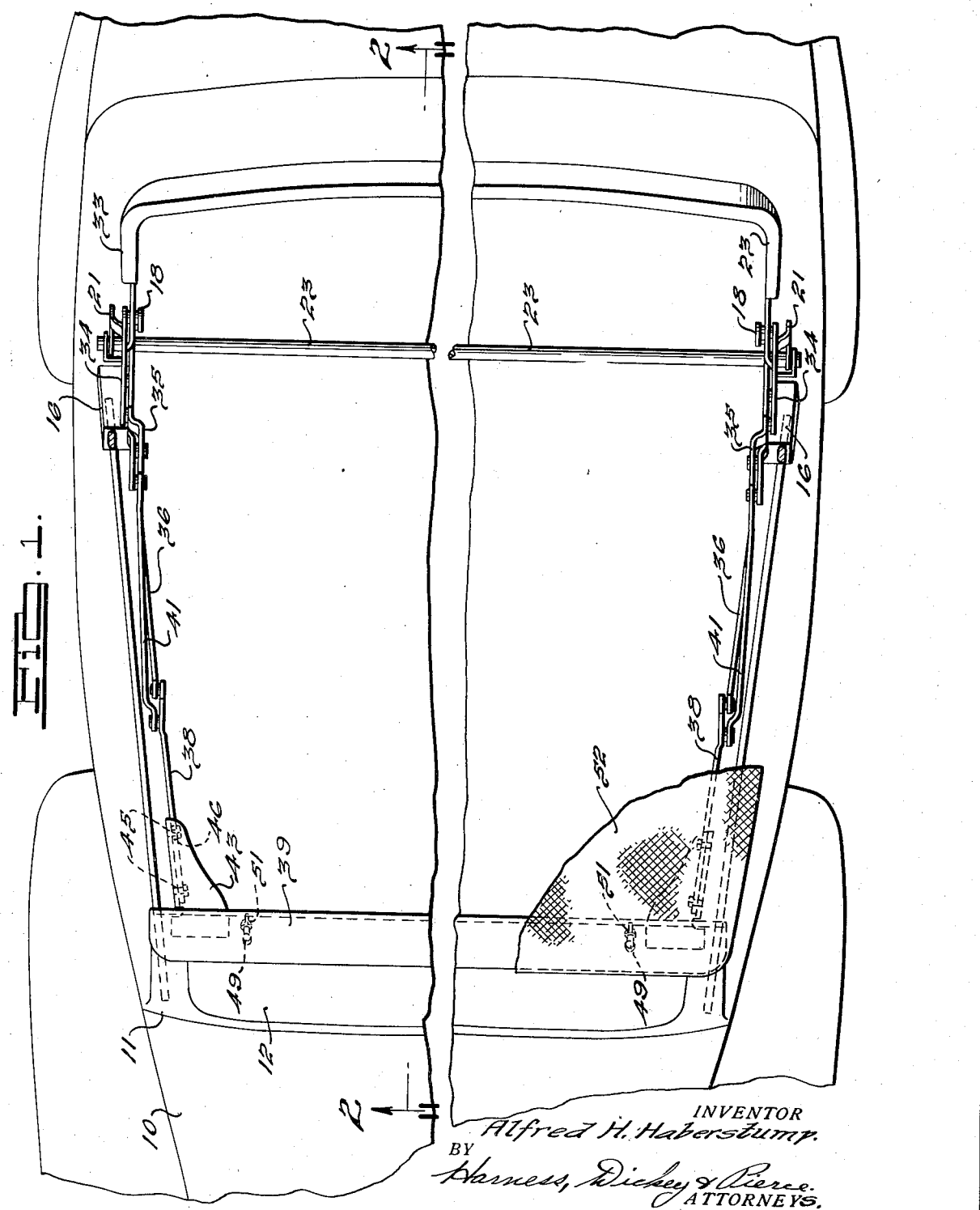

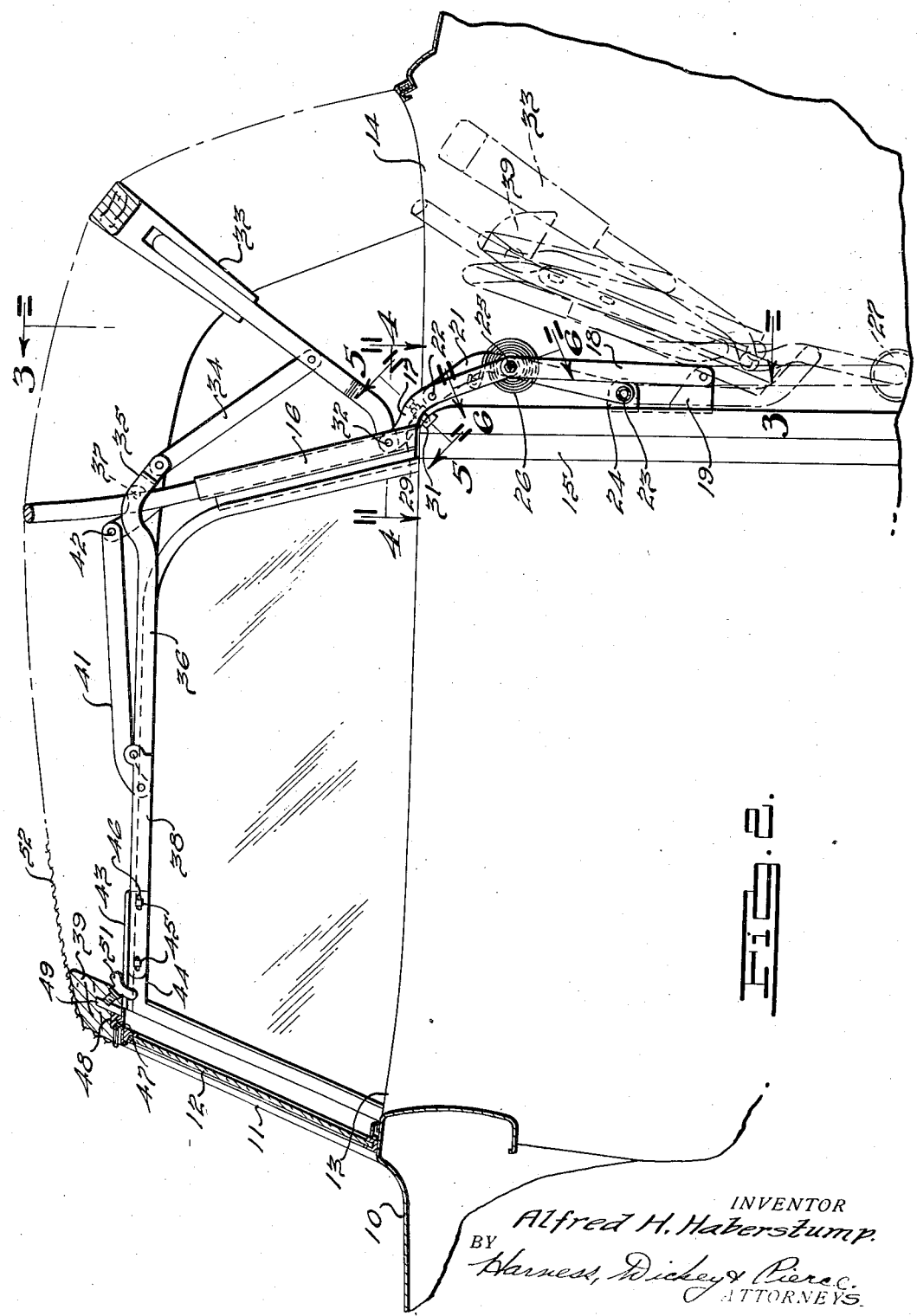

Patented Oct. 17, 1939

2,176,131

UNITED STATES PATENT OFFICE 2,176,131

VEHICLE TOP

Alfred H. Haberstump, Detroit, Mich., assignor to The Murray Corporation of America, Detroit, Mich., a corporation of Delaware Application September 17, 1937, Serial No. 164,291

7 Claims. (Cl. 296—107)

My invention relates to vehicle tops and particularly to a vehicle top of the collapsible type which may be operated to raised or folded position by an operator with very little effort.

Difficulty has always been experienced in the past with collapsible tops due to the fact that they are cumbersome to handle when being raised or lowered and because various clamping means are required to retain the top in raised position. Greater difficulty was experienced when constructing a top which would disappear within the compartment in back of the seat when lowered.

My present invention overcomes the above mentioned difficulties and embodies a main cross-bow which is mounted to move backwardly at the base and downwardly while retaining its substantially vertical position. Spring balancing means is attached to the main bow for counter-balancing the weight of the top so that it may be raised and lowered with a minimum of effort. A secondary bow is pivoted to the main bow and interconnected to an arm on a link which is likewise pivoted to the main bow and which projects forwardly to join with a link rigidly connected to the header. The header link is joined by an additional link to the main bow and through the manipulation of the header the entire top may be moved to raised or lowered position. Suitable clamping means is provided for retaining the header fixed to the windshield frame, which retains the entire top in raised position. It is only necessary, therefore, to loosen the header from the windshield frame to permit the top to be moved to lowered position.

Accordingly, the main objects of my invention are: to provide a foldable top which is secured in raised position by clamping the header to the windshield frame; to provide a top with bows and links which are so inter-related and balanced by spring means to have the top readily moved to raised or lowered position; to mount a main bow of a top in such manner that the bow moves bodily rearwardly and downwardly to be retained substantially in a vertical position at all times; to support a secondary bow on the main bow and interconnect the bows with the vehicle header in such manner that the movement of the header will cause the header and bows to move into nested relation as the main supporting bow moves rearwardly and downwardly; and in general to provide a collapsible top for a vehicle body which is simple in construction, easily moved from raised or lowered position and which is economical of manufacture.

Other objects and features of novelty of my invention will be specifically pointed out, or will become apparent from referring, for a better understanding of my invention, to the following description taken in conjunction with the accompanying drawings, wherein:

Figure 1 is a broken plan view of a vehicle top embodying features of my invention;

Fig. 2 is a sectional view of the structure illustrated in Fig. 1, taken on the line 2—2 thereof;

Fig. 3 is an enlarged sectional view of the structure illustrated in Fig. 2, taken along the line 3—3 thereof;

Fig. 4 is an enlarged sectional view of the structure illustrated in Fig. 2, taken on the line 4—4 thereof;

Fig. 5 is an enlarged sectional view of the structure illustrated in Fig. 2, taken on the line 5—5 thereof; and, Fig. 6 is an enlarged sectional view of the structure illustrated in Fig. 2, taken on the line 6—6 thereof.

The vehicle body 10 is illustrated as being of the convertible type having a windshield frame 11 projecting upwardly from the cowl and sloping rearwardly therefrom. A windshield 12 is sealed to the frame 11 and slopes rearwardly therewith. Rearwardly of the windshield frame 11, doors 13 are hinged to on each side of the body and rearwardly of the doors a well 14 is provided in which the collapsible top is recessed when lowered.

Door jambs 15 terminate at the top at the belt line of the body and a main bow 16 is pivotally supported in extension of the jamb portions. The main bow has an arm 17 at each side of the body pivoted to a link 18 which is pivoted to a bracket 19 secured to the door jamb portions 15 at each side of the body. A link 21 at each side of the body is pivoted to the arm 17, at 22, and is fixed to a cross-bar 23 which is pivoted in a bracket 24 also carried by the jamb portions 15. A pivot pin 25 connects the links 17 and 18 and a clock spring 26 is mounted thereon with the inner end secured to the pin as illustrated in Fig. 6, and the other end provided with a hook 27 which extends over a pin 28 secured to the arm 17. The links 18 and 21 form substantially a parallelogram with the length of the arm 17 between the pivots 22 and 25 and with the support between the pivots and the brackets 19 and 24. The parallelogram arrangement of the links 18 and 21 produces the support of the main bow at all times during its movement and prevents it from moving otherwise than in a predetermined arcuate path.

A predetermined tension is provided to the springs 26 which balances the weight of the top in lowered position so that it may be easily removed from the well 14 to raised position. The particular connection of the links 18 and 21 with the arm 17 permits the main bow 16 to move backwardly and downwardly while retained substantially vertical. The arm 17 carries a stud 29 which is engageable with a plate 31 illustrated more clearly in Fig. 5, by means of which adjustment of the bow may be made relative to the body to have the bow properly positioned when raised.

The lower ends of the bow 16 are provided with pivots 32 for a secondary bow 33 which supports the top material between the main bow and the rear edge of the well 14. The secondary bow is connected at each side by a link 34 to an arm 35 of a link 36, which is pivoted at 37 to the main bow. The link 36 is pivoted to a link 38 at each side of the body, the links 38 engaging the ends of a header 39 for the top. An additional link 41 interconnects the link 38 at each side of the body with the main bow to which they are pivoted by pins 42. The header 39 carries a plate 43 at each of its ends having a downwardly projecting flange 44 to which the links 38 are secured by bolts 45 operating in slots 46 in the link. This permits the header to be adjusted at each side relative to the supporting links and bows.

It is to be understood that the structure illustrated in Fig. 2 for one side of the body is the same on the opposite side, the bows and header being interconnected in the same manner at both sides of the body with the links 21 fixed to the cross-bar 23, which extends across the body of the vehicle. The top of the windshield frame 11 is preferably provided with an angle shaped projection 47 which engages resilient material 48 recessed within the header 39. The windshield frame also carries upwardly projecting pins 49 disposed in extension of the pillar portions of the frame 11 over which the header is disposed and secured through the adjustment of clamping screws 51. A top material 52 is stretched over the main and auxiliary bows and the header and attached to the edge of the opening 14 in the conventional manner.

In operation, to lower the top, the clamping screws 51 are loosened and the header moved upwardly out of engagement with the pins 49. The joints between the links 36 and 48 are broken by the movement of the header upwardly in the presence of the links 41. The link 36 is revolved in a counterclockwise direction to move the secondary bow 33 toward the main bow. In this manner, the header and links 36 and 38 are nested against the main bow from the front, while the secondary bow 33 moves upwardly against the main bow from the rear. Further movement moves the main bow rearwardly of the pillar portions 15 and lowers the ends thereof along with the header and secondary bow vertically downward into the well 14. The downward movement is balanced by the spring 26 which is tensioned thereby and which balances the weight of the collapsible top.

When raising the top, it is only necessary to grasp the header 39 and raise it vertically upward out of the well and forward to have the main bow move in a position of extension of the pillar portion 15. The further movement of the header 39, moves the links 36 and 38 into alignment and the secondary bow 33 in a clockwise direction to the position illustrated. The header is then moved downwardly over the pins 49 and the clamping studs 51 are tightened to secure the header in extension of the windshield frame 11 and retain the top in raised position. The raising of the top requires little effort in view of the energy stored in the springs 26 which counterbalance the weight of the top so that it may be readily lifted from the well and moved into locked relation with the windshield frame.

During the movement of the top, the main bow 16 is prevented from skewing and has elements on one side move into a different position from those on the other side by the crossbar 23 to which the links 21 are rigidly secured. The position and operation of the links, bows and pivot on the opposite sides of the body is, therefore, retained the same at all times and the twisting which would otherwise occur to the bows is thereby eliminated.

While I have described and illustrated but a single embodiment of my invention, it will be apparent to those skilled in the art that various changes, omissions, additions, and substitutions may be made therein without departing from the spirit and scope of my invention, as set forth in the accompanying claims.

I claim as my invention:

1. A collapsible top for a vehicle body having a well including, in combination, a main bow, a secondary bow, a header, said secondary bow and header being pivoted relative to the main bow and collapsible thereon, and a support for said bow in the nature of a parallelogram with joined pivoted sides which moves the main bow bodily rearwardly and downwardly on an arc into said well.

2. A collapsible top for a vehicle body having a well including, in combination, a main bow, a pair of links connected to each end of said main bow at spaced points, spaced supports for said links, said links and spaced points forming a parallelogram support for the main bow which controls its position when moving whereby the main bow may be moved bodily while maintained in vertical position by the support rearwardly and downwardly into said well.

3. A collapsible top for a vehicle body having a well including, in combination, a main bow, a pair of links pivoted to each end of said main bow at spaced points, spaced pivotal supports for said link, said pivot points being disposed on a parallelogram whereby the main bow may be moved bodily while in vertical position rearwardly and downwardly into said well, and a shaft secured to one of said links at each side of said body.

4. A collapsible top for a vehicle body having a well including, in combination, a main bow, a pair of links pivoted to each end of said main bow at spaced points, spaced pivotal supports for said link, said pivot points being disposed on a parallelogram whereby the main bow may be moved bodily while in vertical position rearwardly and downwardly into said well, a shaft secured to one of said links at each side of said body, and springs interconnecting one of said links and main bow at each side of the body.

5. A collapsible top for a vehicle body having a well including, in combination, a main bow, a pair of links pivoted to each end of said main bow at spaced points, spaced pivotal supports for said links, said pivot points being disposed on a parallelogram whereby the main bow may be moved bodily while in vertical position rearwardly and downwardly into said well, a secondary bow pivoted on said main bow, forwardly extending toggle links at each side of said body pivoted to said bow, a header supported by toggle links, and links connecting the toggle links to the main and secondary bows for controlling the position of the header and secondary bow relative to the main bow.

6. A vehicle body having a passenger compartment and a well in the rear thereof, a windshield frame at the front end of the compartment, a collapsible top having a main bow, a link pivoted to each arm of the bow, a second link pivoted to each arm of the bow in spaced relation to said first link, spaced pivotal supports for said links, said pivot points on said links forming a parallelogram, a header, a secondary bow, and interconnecting means between said header, secondary and main bows for controlling the relative position thereof at all times.

7. A vehicle body having a passenger compartment and a well in the rear thereof, a windshield frame at the front end of the compartment, a collapsible top having a main bow, a link pivoted to each arm of the bow, a second link pivoted to each arm of the bow in spaced relation to said first link, spaced pivotal supports for said links, said pivot points on said links forming a parallelogram, a header, a secondary bow, interconnecting means between said header, secondary and main bows for controlling the relative position thereof at all times, and clamping means for securing the header to the top of the windshield frame.

ALFRED H. HABERSTUMP.